US012394082B2

(12) United States Patent
Mckay et al.

(10) Patent No.: US 12,394,082 B2
(45) Date of Patent: Aug. 19, 2025

(54) METHODS AND SYSTEMS FOR RESOLVING 3D POSITIONS OF MULTIPLE OBJECTS PRESENT WITHIN A 3D SPACE

(71) Applicant: Verizon Patent and Licensing Inc., Basking Ridge, NJ (US)

(72) Inventors: Jeremy Mckay, Englewood, CO (US); Tim KuanCheng Hou, Denver, CO (US); Hannah Nicole Aldeborgh, Wheat Ridge, CO (US); Ryan Haldimann, Seattle, WA (US); Brita Bunnell Schneiders Young, Denver, CO (US); Gordon David MacMillan, Boulder, CO (US); James Clague, Longmont, CO (US); Jared David Barnes, Denver, CO (US); John Marco Panettiere, Schnecksville, PA (US); Nicholas Sean Escanilla, Broomfield, CO (US); William John McGuinness, Golden, CO (US); Xiaolin Ren, Queen Creek, AZ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 487 days.

(21) Appl. No.: 17/889,012

(22) Filed: Aug. 16, 2022

(65) Prior Publication Data

US 2024/0062404 A1    Feb. 22, 2024

(51) Int. Cl.
*G06T 7/70*    (2017.01)
*G06T 7/292*   (2017.01)
(Continued)

(52) U.S. Cl.
CPC .............. *G06T 7/70* (2017.01); *G06T 7/292* (2017.01); *G06T 7/50* (2017.01); *G06V 10/764* (2022.01);
(Continued)

(58) Field of Classification Search
CPC .. G06T 7/70; G06T 7/292; G06T 7/50; G06T 2207/10016; G06V 10/764; G06V 20/50; G06V 10/806; G06V 20/52
See application file for complete search history.

(56) References Cited

U.S. PATENT DOCUMENTS

| 11,315,262 | B1* | 4/2022 | Cherevatsky | .......... H04N 7/188 |
| 2008/0056536 | A1* | 3/2008 | Hildreth | ............... G06V 40/107 |
| | | | | 382/103 |

(Continued)

*Primary Examiner* — Wassim Mahrouka

(57) ABSTRACT

An illustrative multi-view 3D positioning system assigns a respective 3D position estimate, with respect to a 3D space, to each of a plurality of detected instance datasets corresponding to objects present within the 3D space. Based on the 3D position estimates, the multi-view 3D positioning system sorts the plurality of detected instance datasets into a plurality of groupings corresponding to the objects so that each detected instance dataset is grouped together with other detected instance datasets corresponding to a same object. The multi-view 3D positioning system then determines a respective 3D position resolution, with respect to the 3D space, for each of the plurality of objects. These 3D position resolutions are determined based on the plurality of groupings of detected instance datasets and represent, with greater accuracy than the 3D position estimates, 3D positions of the objects within the 3D space. Corresponding methods and systems are also disclosed.

17 Claims, 11 Drawing Sheets

(51) Int. Cl.
*G06T 7/50* (2017.01)
*G06V 10/764* (2022.01)
*G06V 20/50* (2022.01)

(52) U.S. Cl.
CPC .... *G06V 20/50* (2022.01); *G06T 2207/10016* (2013.01)

(56) References Cited

U.S. PATENT DOCUMENTS

| | | | | |
|---|---|---|---|---|
| 2015/0199817 | A1* | 7/2015 | Ishimaru | G01S 5/16 382/103 |
| 2021/0056297 | A1* | 2/2021 | Shimshoni | G06V 40/103 |
| 2021/0183098 | A1* | 6/2021 | Huang | G06T 7/596 |
| 2022/0108470 | A1* | 4/2022 | Brown | G06T 7/75 |
| 2024/0282001 | A1* | 8/2024 | Gonzalez | G06T 7/73 |

* cited by examiner

METHODS AND SYSTEMS FOR RESOLVING 3D POSITIONS OF MULTIPLE OBJECTS PRESENT WITHIN A 3D SPACE

BACKGROUND INFORMATION

As an object moves within a 3D space, it may be useful for various applications to keep track of that object and its position within the space. Accordingly, given a video sequence depicting an object in a 3D space, various techniques and technologies have been developed to help achieve this object tracking. For example, certain technologies use computer vision to recognize and identify a particular object within a video sequence, and to track the object from frame to frame of the video as the object moves in the space.

While such technologies are useful under many circumstances, they may be found lacking when it comes to more complex situations. For instance, various challenges may be encountered when trying to simultaneously track a plurality of different objects moving within a scene (including, perhaps, a large number of similar-looking objects or objects of the same type) that would not need to be addressed by technologies configured to track a single moving object in a scene. Additionally, certain 3D spaces may be too large to be adequately captured from a single viewpoint or by a single image capture device (e.g., video camera, etc.), thereby creating tracking challenges and complexities as objects move in and out of different fields of view of different image capture devices that may or may not overlap. Circumstances characterizing certain applications may also introduce design requirements (e.g., timing-related requirements, indoor/outdoor usage requirements, cost requirements, ease of use/setup requirements, etc.) that existing technologies are not prepared to adequately satisfy.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
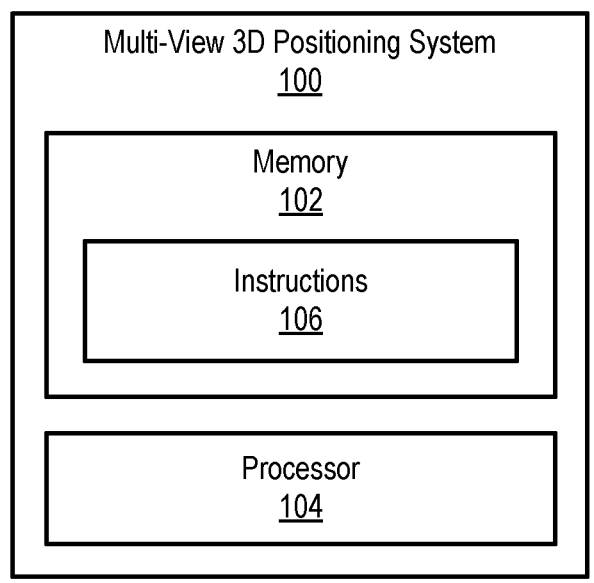
FIG. 1 shows an illustrative multi-view 3D positioning system configured to resolve 3D positions of multiple objects present within a 3D space.

Methods and systems for resolving 3D positions of multiple objects present within a 3D space are described herein. Such systems may be referred to as multi-view 3D positioning systems, since the system may determine the 3D positions for objects (e.g., first by roughly estimating the positions and then by resolving the positions more accurately as will be described) using imagery captured from multiple viewpoints within the 3D space (e.g., by different image capture devices positioned at different locations to provide views of different parts of the 3D space). Additionally, as further described herein, once 3D positions for objects have been determined, multi-view 3D positioning systems may track the objects within the 3D space as the objects move about the 3D space as time passes.

In this way, useful information (e.g., analytics information, logistics information, etc.) may be obtained and provided to the advantage of a variety of different types of applications and use cases. For instance, one illustrative application or use case that will be referred to and illustrated in the description below to provide context to various principles is a warehouse application. In this application, the 3D space will be understood to be a warehouse and the objects may include things such as inventory stored in the warehouse (e.g., boxes, packages, pallets, and/or other such items), personnel working in the warehouse, equipment used by the personnel (e.g., forklifts, handtrucks, etc.), and so forth.

This warehouse application is convenient for illustrating various principles associated with methods and systems described herein, including that they may operate in real time, that they may operate indoors and within a relatively large area (e.g., an area that requires many image capture devices to fully capture), that the overall number of objects being tracked may be large, that the scene may be relatively complex, and so forth. That being said, it will also be understood that principles described herein in the context of the warehouse example may also be readily applied to a variety of other applications and use cases. Some of these additional applications and use cases may not require or implement real-time operation; may be associated with outdoor spaces or other types of indoor spaces (e.g., indoor spaces that are smaller than a warehouse and/or are used for different purposes); may involve different numbers and types of objects being located and tracked; may include different types, numbers, and setups for image capture devices and computing devices processing captured imagery; and so forth. For instance, a few additional (and non-limiting) examples of applications and use cases that may benefit from methods and systems described herein may include: providing real-time corrections for fleets of drones, managing shipping ports where large numbers of shipping containers are being moved, analyzing construction sites where structures are built by large numbers of workers, and tracking objects of interest in connection with automated guided vehicles (AGVs) moving through 3D space (e.g., tracking the objects precisely without requiring use of detectable measurement devices such as laser range finders, etc.). In these or other examples, image capture devices associated with ground-based and/or air-based imaging assets (e.g., planes, satellites, ground-based imaging, etc.) may be combined to locate and track objects in the air or on the ground.

As will be described in more detail below, multi-view 3D positioning systems described herein may operate using computer vision techniques that allow for 3D positions of multiple objects to be resolved and tracked without reliance on depth detection techniques that are less cost-effective (e.g., techniques involving time-of-flight (ToF) principles, etc.), less flexible or effective (e.g., techniques involving structure-from-motion (SfM) principles requiring movement of the viewpoints themselves, etc.), or that suffer from other similar drawbacks. Rather, multi-view 3D positioning systems described herein may be implemented using equipment that is readily available (e.g., off-the-shelf image capture devices and embedded computing systems) and cost effective enough to allow for deployment of large numbers of devices throughout a 3D space (e.g., to allow for many cameras and computing devices to be placed throughout a large warehouse).

Once deployed and calibrated, multi-view 3D positioning systems described herein may operate by performing any of the functions described herein. For example, image capture devices may capture imagery of a 3D space and various objects included therein. On-site computing devices associated with the image capture devices (e.g., including computing resources integrated into the image capture devices themselves) may be used to identify objects within the imagery and to track the objects in two dimensions from frame to frame, assigning contiguous identifiers to the objects. Based on pre-calibrated extrinsic parameters of the image capture devices, on-premise computing devices may use principles of monocular depth estimation to roughly project objects captured by different image capture devices into a 3D space shared by other image capture devices. On-premise or off-premise computing devices (e.g., including multi-access servers such as multi-access edge compute (MEC) servers implemented on provider networks) may analyze these projections to sort them into groupings of projections that represent the same physical object as captured from different viewpoints. Based on these groupings, the various estimations of the 3D positions of the object may then be resolved and refined to be more precise by triangulating the projections within a grouping (resulting in 3D position resolutions of the objects). A registry of objects and their 3D position resolutions may be maintained and updated as additional data is received, and the multi-view 3D positioning system may publish and/or otherwise use information representative of the objects and their resolved locations to accomplish whatever objectives a particular application or use case may have. As one example, position information for various objects may be stored temporally in the registry such that a filtering algorithm (e.g., a Kalman filter, etc.) may be used to estimate velocity and/or acceleration of the objects through 3D space.

Along with flexibility and cost efficiency advantages that may arise from the equipment on which multi-view 3D positioning systems are implemented (as described above), other technical advantages and benefits may also be provided by systems and methods described herein. For example, object locating and tracking may be performed in real time or may be time shifted; multi-view 3D positioning systems may be readily scalable to include any number of views being used to locate and track any number of objects within an indoor or outdoor 3D space of arbitrary size; a desired accuracy of resolved 3D positions of objects may be readily balanced with cost/efficiency restraints by adding views to (or removing views from) the multi-view 3D positioning system (i.e., since, as will be made apparent below, more overlapping views capturing an object allows for the position of the object to be resolved more accurately); and so forth.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for resolving 3D positions of multiple objects present within a 3D space may provide any of the benefits mentioned above, as well as various additional and/or alternative benefits that will be described and/or made apparent below.

FIG. 1 shows an illustrative multi-view 3D positioning system 100 ("system 100") configured to resolve 3D positions of multiple objects present within a 3D space. System 100 may be implemented by computer resources such as processors, memory facilities, image capture devices (e.g., digital cameras, etc.), storage facilities, communication interfaces, and so forth. For example, system 100 may include or be communicatively coupled to a plurality of image capture devices that are disposed within the 3D space and are configured to capture 2D imagery on which various detected instance datasets described in more detail below may be based. Moreover, system 100 may further include memory storing instructions and one or more processors communicatively coupled to the memory and configured to execute the instructions to perform functions described herein. For instance, the memory and one or more processors may be implemented by one or more on-premise computing devices (e.g., relatively small and portable embedded systems devices) operating at a site of the 3D space, by an on-premise or off-premise server or other computing system communicatively coupled to the on-premise computing devices (e.g., a larger computing system configured to serve several or all of the on-premise computing devices) and configured to perform the same or other functions described herein, and/or within any other computing system as may serve a particular implementation.

In some examples, on-premise computing devices may be communicatively coupled with the image capture devices and distributed in a one-to-one manner (i.e., such that there is a dedicated on-premise computing device for each individual image capture device). These on-premise computing devices may be configured to generate detected instance datasets based on 2D imagery captured by the image capture devices, to assign respective 3D position estimates to at least some of the detected instance datasets, and to perform other functions described herein. A server communicatively coupled to some or all of the on-premise computing devices may be implemented as a multi-access edge compute (MEC) server operating on a provider network (e.g., a carrier network provided by a cellular data services provider, etc.), by a cloud server accessible by way of the Internet, or the like. The server may be configured to sort detected instance datasets into groupings corresponding to different objects, determine respective 3D position resolutions for objects based on the groupings of detected instance datasets, and perform other functions described herein.

A generalized representation of system 100 is shown in FIG. 1 to include a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 (e.g., image capture devices, etc.) may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with resolving 3D positions of multiple objects present within a 3D space in accordance with methods and systems described herein and/or as may serve a particular implementation.

Figure 2:
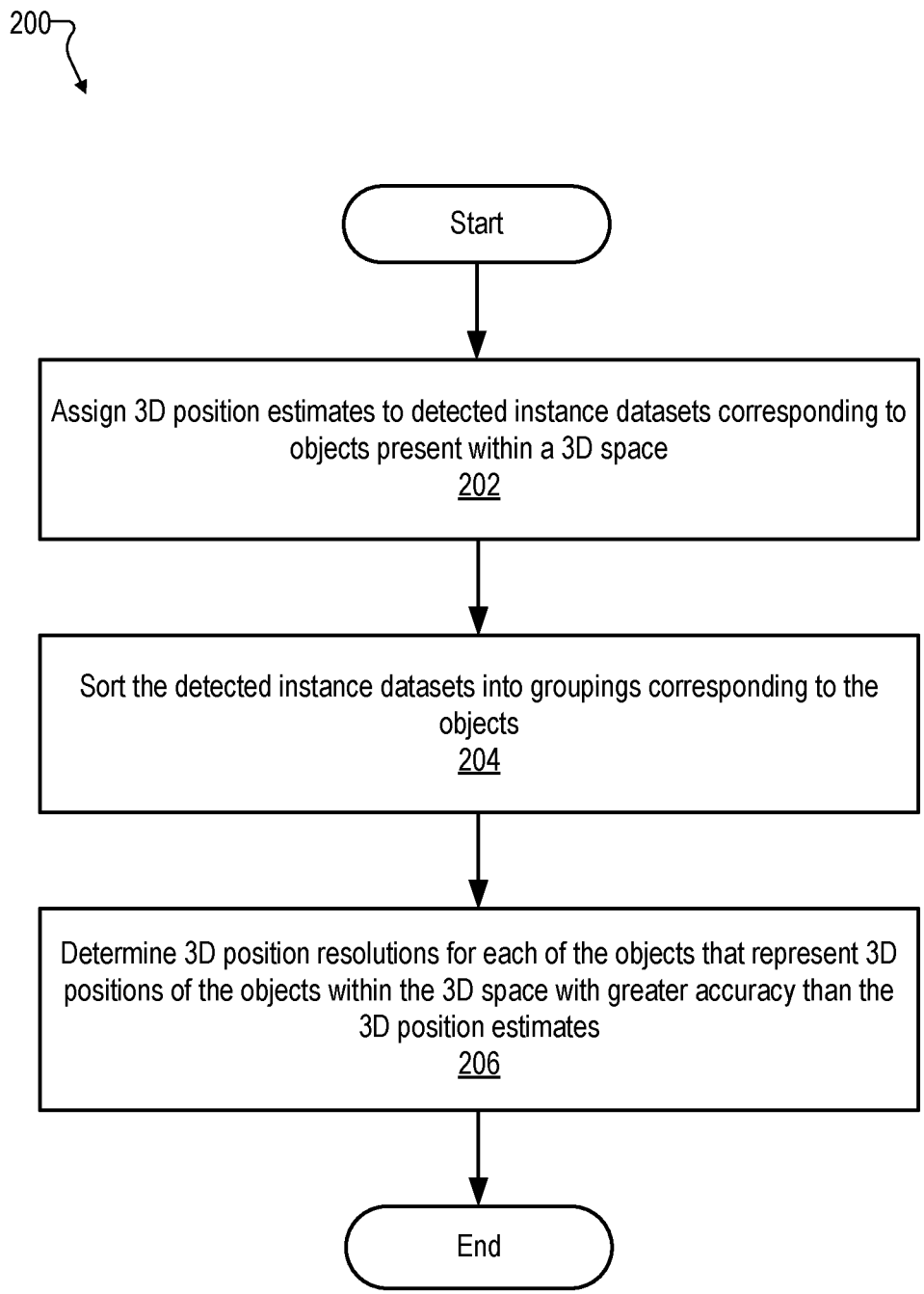
FIG. 2 shows an illustrative method for resolving 3D positions of multiple objects present within a 3D space.

As one example of functionality that processor 104 may perform, FIG. 2 shows an illustrative method 200 for resolving 3D positions of multiple objects present within a 3D space. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a multi-view 3D positioning system such as system 100 and/or any implementation thereof.

In certain examples, operations of method 200 may be performed in real time so as to provide, receive, process, and/or use data described herein immediately as the data is generated, updated, changed, exchanged, or otherwise becomes available (e.g., determining accurate position data and tracking objects immediately as the objects move within the 3D space). In such examples, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, system 100 may assign a respective 3D position estimate, with respect to a 3D space, to each of a plurality of detected instance datasets corresponding to a plurality of objects present within the 3D space. As will be described in more detail below, detected instance datasets may be generated (e.g., at operation 202 or prior to the performance of operation 202) based on 2D imagery that is captured by a plurality of image capture devices that provide different views of a 3D space. As a simple example, for instance, a 3D space in which three objects are each captured by four cameras will be considered. For a particular moment in time (e.g., a period of time associated with a single frame of video captured by the cameras), up to twelve (i.e., 3 multiplied by 4) detected instance datasets may be generated to represent each of the three objects as captured from each of the four viewpoints of the cameras.

Continuing this simple example, at operation 202, some or all of these detected instance datasets may be assigned a 3D position estimate. For example, after the objects are recognized, identified, labeled, etc. (processes that will be described in more detail below), a monocular depth estimation technique may be performed with respect to each of the captured 2D images such that a relatively rough (i.e., imprecise) projection into a global coordinate space referenced by all of the cameras in the system may be made for each object. Because intrinsic and extrinsic parameters of each image capture device may be known with relatively high precision (e.g., based on a calibration process performed prior to operation 202), the position of the object with respect to a particular camera may be determined relatively precisely in two dimensions (based on the 2D imagery), while the third dimension (i.e., the depth dimension) may involve a less precise estimation at this point in the process. To more precisely resolve this third dimension, method 200 may continue on to operations 204 and 206, where 3D position estimates from multiple views for each object are combined.

At operation 204, system 100 may sort the plurality of detected instance datasets based on the 3D position estimates assigned to the detected instance datasets at operation 202. For example, system 100 may sort the detected instance datasets into a plurality of groupings that each correspond to different objects of the plurality of objects so that each detected instance dataset is grouped together with other detected instance datasets corresponding to a same object. Referring to the simple example introduced above, for instance, operation 204 may involve sorting the twelve detected instance datasets into three groupings of four datasets each (one grouping for each of the three objects), based on the respective 3D position estimates. Each grouping in this example may correspond to a particular one of the objects and may include detected instance datasets for that object from each of the four cameras. Because the dimensions associated with greater certainty and the depth dimension associated with less certainty vary across the four detected instance datasets (due, in part, to differences between views from which the detected instance datasets are generated and also possibly due to other factors such as calibration accuracy, lighting, etc.), combining corresponding data within a particular grouping may allow for the 3D position to be refined and resolved into what is referred to herein as a 3D position resolution. It will be understood that 3D position resolutions are generally more accurate and precise than 3D position estimates due to the nature of how each is determined.

At operation 206, system 100 may determine a respective 3D position resolution, with respect to the 3D space, for each of the plurality of objects. For example, the 3D position resolutions for the various objects may be determined based on the plurality of groupings of detected instance datasets sorted at operation 204 by triangulation techniques and other techniques described herein. Ultimately, the twelve 3D position estimates of the simple example introduced above may be refined into three 3D position resolutions that represent, with greater accuracy than the 3D position estimates, respective 3D positions of each of the three example objects within the 3D space. This resolved 3D position data may then be continuously tracked over time, provided to other systems, and/or otherwise used in any manner as may serve a particular implementation.

Figure 3:
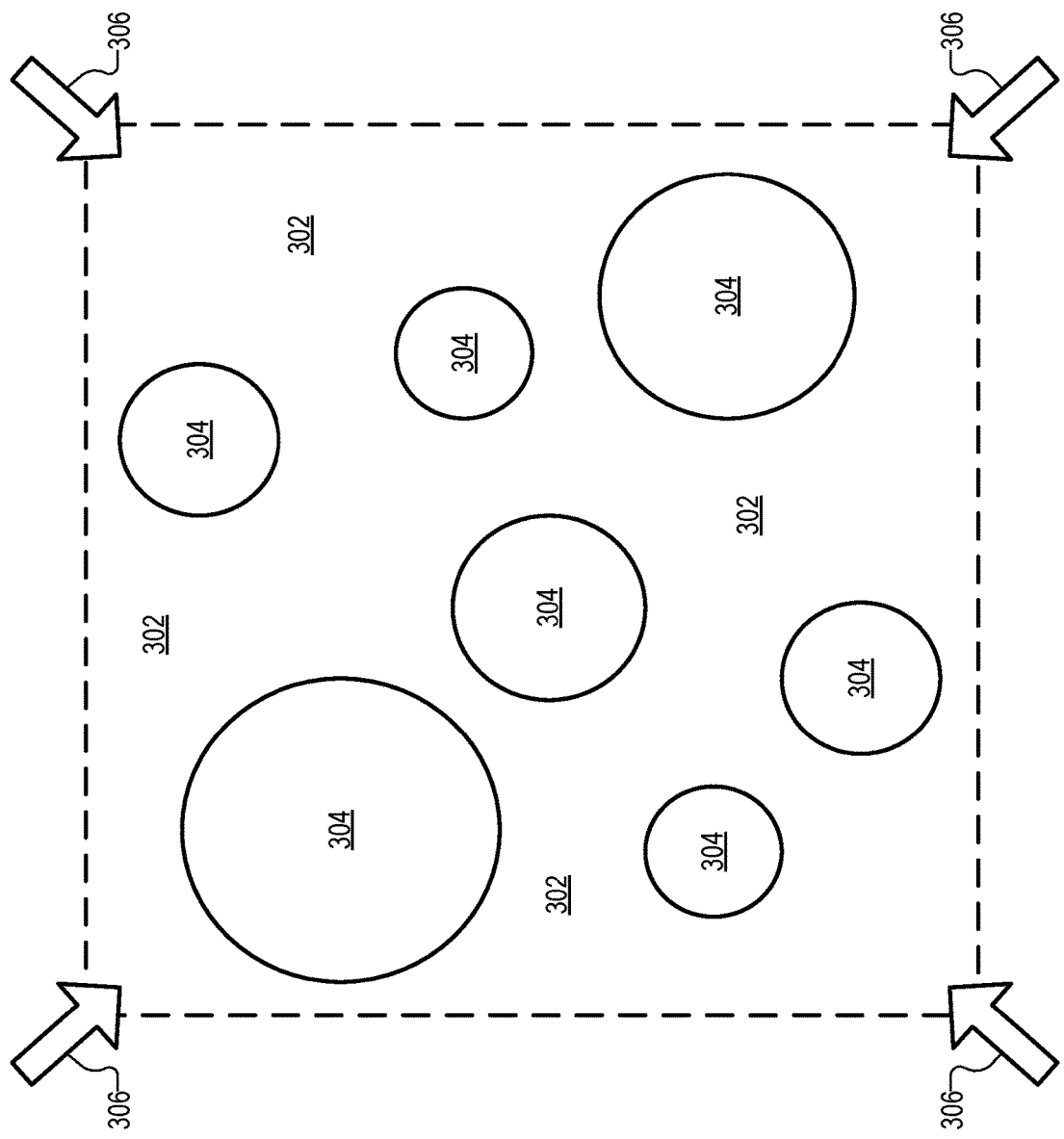
FIG. 3 shows an illustrative 3D space including multiple objects that may be tracked by multi-view 3D positioning systems described herein.

To further illustrate certain principles mentioned in the description of method 200, FIG. 3 shows an illustrative 3D space 302 that is outlined by a dashed square for purposes of illustration, though it will be understood that a 3D space may be any shape or size and may or may not be contained within a well-defined outer boundary. 3D space 302 is shown to include a plurality of objects 304 that may be tracked by a multi-view 3D positioning system described herein such as system 100. While objects 304 are illustrated as differently sized circles in FIG. 3, it will be understood that these objects may represent any suitable objects that may be present in a given 3D space. For example, referring back to the warehouse example mentioned above, 3D space 302 could be implemented as a warehouse space in which warehouse personnel use equipment to manage inventory stored in the warehouse space, and the plurality of objects 304 could then include one or more object associated with the warehouse personnel (e.g., a worker), one or more objects associated with the equipment (e.g., a forklift), one or more objects associated with the inventory stored in the warehouse space (e.g., a box), and so forth.

FIG. 3 further shows a plurality of views 306 that could be used by an example multi-view 3D positioning system (e.g., an implementation of system 100). As shown, views 306 are represented by arrows in the corners of 3D space 302 that are oriented to be facing inward toward 3D space 302 and the objects 304 included therein. These views 306 could be obtained, for example, by positioning four image capture devices (e.g., cameras) in the corners of 3D space 302 and pointing the devices inward toward the center of the space.

Figure 4:
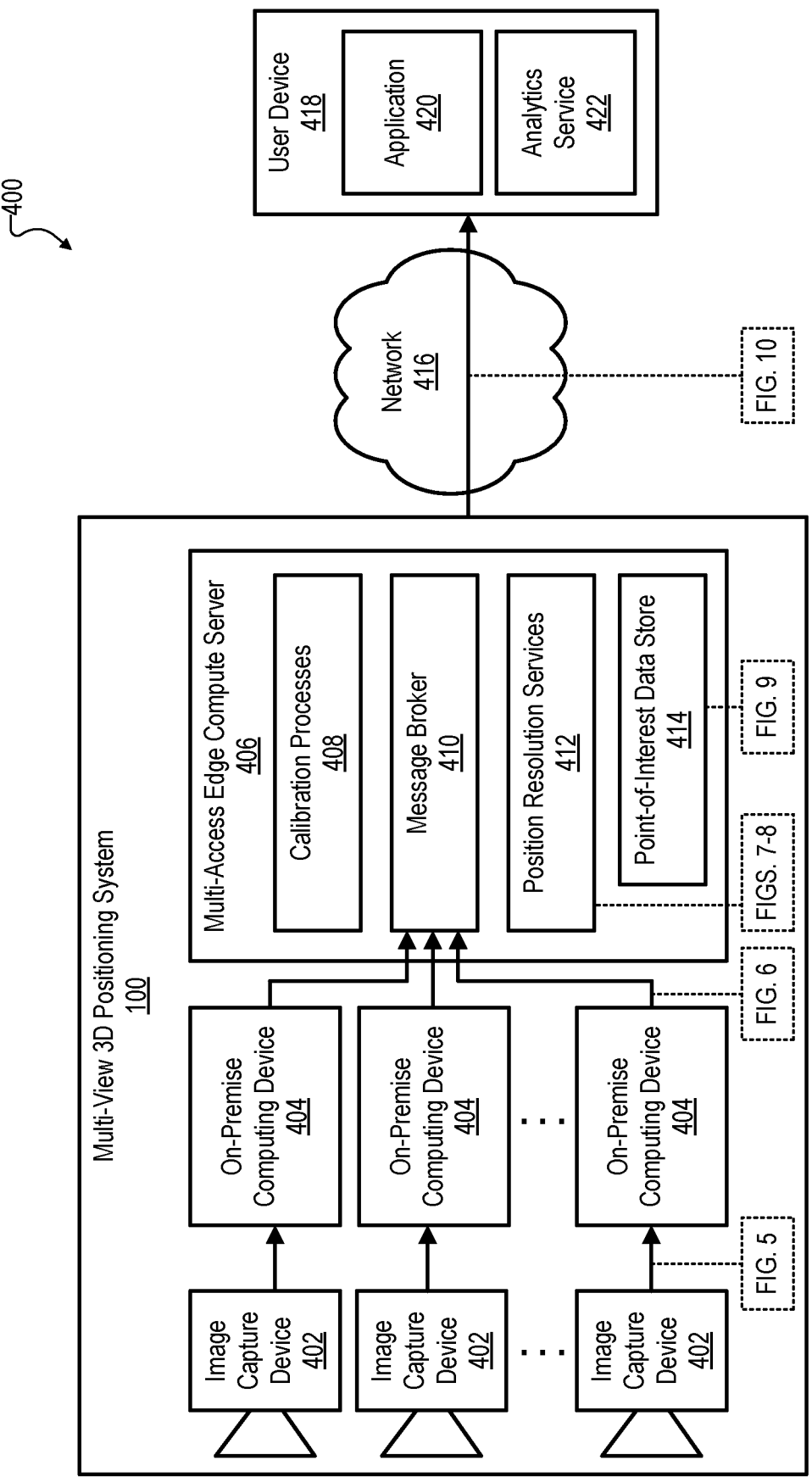
FIG. 4 shows an illustrative implementation of a multi-view 3D positioning system operating in an illustrative configuration.

FIG. 4 shows an illustrative implementation of system 100 operating in an illustrative configuration 400 to help fulfill objectives of a particular application (e.g., a warehouse application, any of the other applications or use cases mentioned herein, or any other suitable application or use case as may serve a particular implementation). As shown, this implementation of system 100 includes a plurality of image capture devices 402 associated one-to-one with a plurality of on-premise computing devices 404. The on-premise computing devices 404 are communicatively coupled with a multi-access edge compute (MEC) server 406 that happens to serve all of the on-premise computing devices 404 in this example. MEC server 406 is shown to include various facilities implementing calibration processes 408, a message broker 410, position resolution services 412, and a point-of-interest data store 414. In configuration 400, system 100 is shown to communicate by way of a network 416 with a user device 418 that implements, in this example, an application 420 and an analytics service 422.

Image capture devices 402, on-premise computing devices 404, and MEC server 406 may be implemented in accordance with devices and computing systems described above (e.g., cameras, small embedded systems devices, larger server devices, etc.). Network 416 may be implemented by any suitable private or public networks (e.g., a provider-specific wired or wireless communications network such as a cellular carrier network operated by a mobile carrier entity, a local area network (LAN), a wide area network, the Internet, etc.) and may use any communication technologies, devices, media, protocols, or the like, as may serve a particular implementation. User device 418 may represent any type of device where data provided by system 100 interfaces with some type of user to be applied for some type of use. For example, user device 418 may be a MEC server (e.g., the same MEC server 406 or another MEC server) or a cloud server accessed by a user or system with some interest in the location data provided by system 100. As another example, user device 418 may be implemented by a user device such as a personal computer or mobile device (e.g., smartphone, tablet, etc.) by way of which a user makes use of the location data provided by system 100.

Specific functions and sub-elements of these major components of configuration 400 will now be described with reference both to FIG. 4 and to FIGS. 5-10. Specifically, as indicated by tags with dotted outlines in FIG. 4, FIG. 5 will be referenced to describe 2D imagery captured by image capture devices 402 and how the 2D image data is processed, FIG. 6 will be referenced to illustrate detected instance datasets output by on-premise computing devices 404, FIGS. 7 and 8 will be referenced to illustrate how position resolution services 412 may determine 3D position resolutions for various objects depicted in the 2D imagery, FIG. 9 will be referenced to illustrate aspects of an implementation of point-of-interest data store 414, and FIG. 10 will be referenced to illustrate the output of system 100 that will be used by user device 418.

Figure 5:
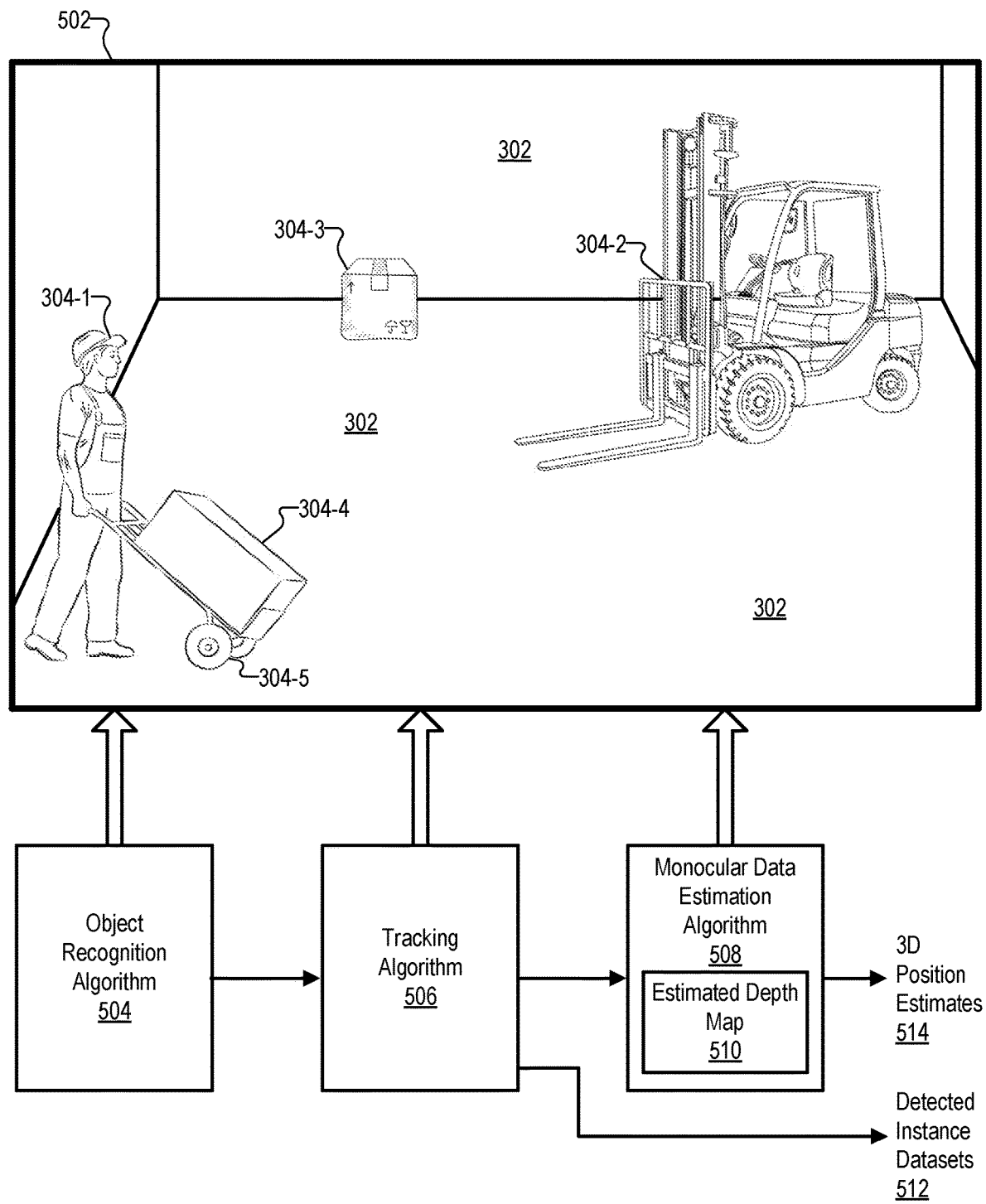
FIG. 5 shows an illustrative image depicting a 3D space with multiple objects and several illustrative algorithms used by a multi-view 3D positioning system to process the image.

FIG. 5 shows an illustrative 2D image 502 depicting an example of 3D space 302 (an indoor warehouse space in this example) with multiple examples of objects 304 including a worker object 304-1, a forklift object 304-2, a box object 304-3 resting on the ground, another box object 304-4 that is being moved by the worker, and a handtruck object 304-5 being used by the worker to move box object 304-4. It will be understood that the objects 304 depicted in 2D image 502 are provided only by way of example. Larger or more complex warehouse examples may thus include many more objects 304 and a larger 3D space 302, while other examples may involve outdoor spaces or other types of spaces unrelated to warehouses.

After being captured (e.g., by one of image capture devices 402), 2D image 502 may be processed in various ways (e.g., by one of on-premise computing devices 404). To illustrate, FIG. 5 shows three computer vision algorithms 504, 506, and 508 that may be used in the processing and analysis of 2D image 502 to thereby generate an estimated depth map 510 and to provide a plurality of detected instance datasets 512 and a plurality of 3D position estimates 514 for the objects 304 depicted within 2D image 502. Each of these algorithms will now be described in more detail.

Using an object recognition algorithm 504, system 100 may be configured to identify each object 304 within 2D image 502. More particularly, object recognition algorithm 504 may be used to semantically segment each object 304 from other objects and background content depicted in image 502, and to identify a class in which each object is to be categorized. For example, object recognition algorithm 504 may segment the worker object 304-1 and classify him as a human being, segment the forklift object 304-2 and classify it as a vehicle (or, more specifically, as a forklift), segment each of the box objects 304-3 and 304-4 and classify them as inventory items (or, more specifically, as boxes), and so forth. In some implementations, object recognition algorithm 504 may be implemented by a You-Only-Look-Once (YOLO) algorithm or by another such object recognition algorithm (e.g., an established or custom algorithm). While FIG. 5 shows only one 2D image 502 depicting 3D space 302 from only one particular viewpoint, it will be understood that system 100 may use the same algorithm to identify these same objects 304 within other 2D images that depict 3D space 302 from other viewpoints (e.g., by being captured by image capture devices positioned elsewhere within the 3D space 302). As will be made more apparent below, capturing data for each object 304 from multiple views 306 (e.g., due to overlapping fields of view of the image capture devices 402) may allow for accurate 3D positioning to be performed by correlating the different detected instances of each object from the different viewpoints with one another and analyzing them in a manner that allows the multi-view information to be accumulated.

To assist with such correlating, a tracking algorithm 506 may be used by system 100 to assign respective 2D identifiers to each particular object 304 identified within 2D image 502 by way of object recognition algorithm 504. Tracking algorithm 506 may operate based on the identifying of objects 304 performed by object recognition algorithm 504 and may be configured to track object depictions that move from frame to frame in a 2D frame sequence. For example, the tracking algorithm may be implemented by a Deepsort tracking algorithm or another suitable tracking algorithm configured to label (e.g., assign 2D identifiers to) different objects in a manner that facilitates correlating the labeled object depictions with other labeled object depictions in other 2D images that are processed in the same way (and that depict the same objects 304) at different points in time. As shown in FIG. 5, and as will be described and illustrated in more detail below with reference to FIG. 6, various detected instance datasets 512 may be generated for each instance of an object being identified (e.g., by way of object recognition algorithm 504) within a 2D image and labeled (e.g., by way of tracking algorithm 506). Accordingly, tracking algorithm 506 may associate, within each detected instance dataset 512, the particular object represented by the detected instance datasets with the respective 2D identifiers assigned to that particular object. As will be explained in more detail below, certain of these detected instance datasets 512 may be used straightaway (i.e., without waiting for a respective 3D position estimate 514) while, for others detected instance datasets 512, a 3D position estimate 514 may be generated and associated with the detected instance datasets 512.

3D position estimates 514 may be generated and assigned to detected instance datasets 512 based on: 1) extrinsic parameters of the set of image capture devices capturing the 2D imagery (e.g., including 2D image 502) on which the plurality of detected instance datasets 512 is based; and 2) an estimated depth map 510 for objects 304 depicted in the 2D imagery (where estimated depth map 510 is generated by a monocular depth estimation algorithm 508 configured to estimate depth based on monoscopic imagery). More particularly, as shown, 3D position estimates 514 are shown to be generated by way of a monocular data estimation algorithm 508 that may generate, maintain, update, and/or otherwise make use of an estimated depth map 510 of 3D space 302 from the viewpoint of 2D image 502. Many depth detection algorithms require reliance on things like multiple 2D images from different viewpoints (e.g., stereoscopic depth detection algorithms), projections of light into the scene (e.g., structured light and time-of-flight depth detection algorithms), continuous movement of the image capture device viewpoint (e.g., structure-from-motion depth detection algorithms), and so forth. In contrast to these algorithms, monocular data estimation algorithm 508 may determine estimated depth map 510 based only on computer vision principles. More particularly, algorithm 508 may determine estimated depth map 510 based on the 2D image 502 itself and based on pre-calibrated extrinsics of the image capture device. For example, by applying a deep learning model trained up for the types of objects 304 that are found in a particular 3D space 302, monocular data estimation algorithm 508 may approximate the depth of each object based on the appearance of the objects in the 2D image and based on what the model indicates for the estimated size of these objects (e.g., the average height of a male worker or a handtruck, the average length and width of a particular model of forklift, etc.).

While estimated depth map 510 may not provide objective depth estimates (e.g., in feet or meters from the image capture device, etc.), it may nevertheless provide good enough relative approximations of the depths of the various objects that 3D position estimates 514 may be generated and assigned to each detected instance datasets 512 for use in the ways described herein (e.g., ultimately to facilitate sorting the detected instance datasets 512 and determining a highly accurate 3D position resolution for each object 304).

Any suitable component of system 100 may be configured to perform the functions of computer visions algorithms 504, 506, and 508. For example, the image capture devices 402 may include sufficient onboard processing to run deep learning modules capable of implementing object recognition algorithm 504, individual on-premise computing devices 404 corresponding to the image capture devices 402 in a one-to-one manner may then be configured to perform the functions of tracking algorithm 506 and monocular data estimation algorithm 508, and the various detected instance datasets 512 and corresponding 3D position estimates 514 may then be provided to MEC server 406.

The plurality of detected instance datasets 512 may include various detected instance datasets that each correspond to a particular object 304 and are each generated based on the 2D image 502 depicting that particular object. It will be understood that other detected instance datasets corresponding to the same objects 304 may be generated based on other 2D images that depict the same objects 304 from different viewpoints. For example, an overall set of detected instance datasets 512 that may be provided by the set of on-premise computing devices 404 to MEC server 406 may include at least: 1) a first detected instance dataset 512 corresponding to a particular object 304 of the plurality of objects, the first detected instance dataset generated based on a first 2D image 502 depicting the particular object 304 and captured by a first image capture device 402 in 3D space 302; and 2) a second detected instance dataset 512 corresponding to that same particular object 304, the second detected instance dataset generated based on a second 2D image 502 depicting the particular object 304 (i.e., a different 2D image from a different viewpoint) and captured by a second image capture device 402 in 3D space 302. Moreover, various other detected instance datasets corresponding to this object 304, other objects 304, various 2D images captured from various viewpoints, etc., may also be included in the set provided to MEC server 406 in this example.

Figure 6:
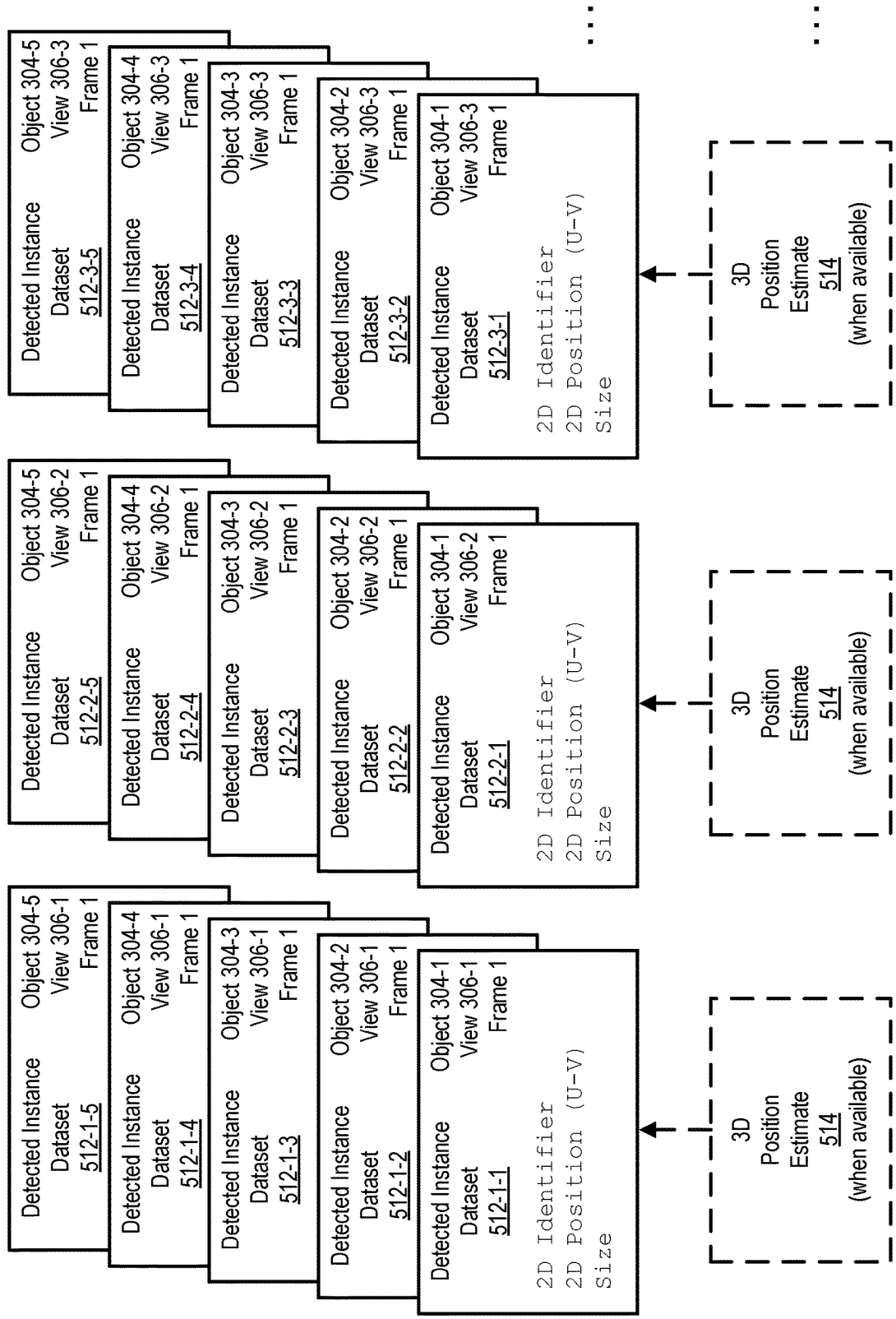
FIG. 6 shows illustrative aspects of a variety of detected instance datasets used by a multi-view 3D positioning system for resolving 3D positions of multiple objects present within a 3D space.

To illustrate, FIG. 6 shows illustrative aspects of a variety of detected instance datasets 512 used by system 100 in this example. As shown, each detected instance dataset 512 represented in FIG. 6 is labeled using a numbering scheme that indicates both the object 304 and the view 306 that the detected instance dataset 512 corresponds to. Specifically, as used herein and as shown in FIG. 6, a detected instance dataset 512-X-Y will be understood to indicate that a detected instance of an object 304-Y is represented as captured from a view 306-X. For example, detected instance dataset 512-1-1 is shown to represent a detected instance dataset for object 304-1 as captured from an image capture device having view 306-1, detected instance dataset 512-1-2 is shown to represent a detected instance dataset for object 304-2 as captured from the same image capture device with view 306-1, detected instance dataset 512-2-1 is shown to represent a detected instance dataset for object 304-1 as captured from an image capture device having view 306-2, and so forth. The respective objects and views are also indicated in the corner of each detected instance dataset 512 shown in FIG. 6, as well as a frame number indication ("Frame 1" in these examples).

While the frame numbers for all of the detected instance datasets 512 shown in FIG. 6 are the same to indicate that they all represent approximately the same moment in time, it will be understood that a short time later (e.g., one frame time later, which may be a few tens of milliseconds or the like, depending on the frame rate of the video), a new set of detected instance datasets 512 (for Frame 2, in this example) may be generated and analyzed in the same way as described herein for the set shown in FIG. 6. It will also be understood that image capture devices 402 need not necessarily be synchronized, such that Frame 1 for one view 306 may not perfectly temporally line up with Frame 1 for another view 306. Specifically, for example, the plurality of detected instance datasets 512 may include: 1) a first detected instance dataset 512 generated based on a first 2D image 502 that is captured by a first image capture device 402 in 3D space 302, and 2) a second detected instance dataset 512 generated based on a second 2D image 502 that is captured, asynchronously with the first 2D image 502, by a second image capture device 402 in 3D space 302. A message buffer (e.g., a circular message buffer, etc.) implemented in the architecture receiving detected instance datasets 512 (e.g., within MEC server 406 in this example) may be used to analyze the detected instance datasets 512 that come in from the various image capture devices and on-premise computing devices even though they are not perfectly synchronized from view to view.

As shown in FIG. 6, each detected instance dataset 512 may include various datapoints (indicated with a monospace font within the detected instance datasets in FIG. 6) indicative of various characteristics of the detected instance of the object 304 that is represented by the detected instance dataset. Specifically, as shown, each detected instance dataset 512 may include: a respective 2D identifier associated with the particular object 304, a respective 2D position of a depiction of the particular object with respect to a 2D image 502 on which the detected instance dataset is based (e.g., in U-V coordinates from the particular view 306), an indication of a size of the depiction of the particular object 304 with respect to the 2D image 502, and any other indicators (e.g., the class of the object 304, etc.) as may serve a particular implementation.

FIG. 6 further shows, with dashed lines, that respective 3D position estimates 514 may be associated with at least some of the detected instance datasets 512 ("when available"). When a new object appears in the 3D space (or in a portion of the 3D space that is visible from a particular view 306), a 3D position estimate 514 may be determined and assigned to detected instance datasets 512 for that object. For example, this situation may occur at start up, when a new object is introduced to 3D space 302, when an object that was previously occluded from a particular view becomes visible (e.g., something blocking the view moves to reveal what was behind it), or under other similar circumstances. While it would be suitable for every detected instance dataset 512 to be assigned a 3D position estimate 514, this may not be necessary or even beneficial from a practical point of view. This is because monocular data estimation algorithm 508 may require significantly more computation than other algorithms involved in generating detected instance datasets 512, such that it may not be practically possible to provide 3D position estimates 514 for every detected instance dataset 512 in real time. For example, while a frame rate for the detected instance datasets may be on the order of, e.g., 30 Hz, monocular data estimation algorithm 508 may only be able to process frames on the order of, e.g., 2 Hz. Fortunately, once a 3D position estimate 514 (and eventually a 3D position resolution) has been generated for a particular object viewed from a particular viewpoint, this information may be logged (described in more detail below) so that future detected instance datasets 512 associated with later frames do not necessarily need to be assigned respective 3D position estimates 514 to be useful. As such, once a point-of-interest dataset for a particular object 304 is generated, the point-of-interest dataset may be updated at a high rate (e.g., with every new video frame) without waiting for monocular depth estimates to be computed at the slower rate.

Returning to FIG. 4, messages provided from each on-premise computing device 404 are shown to be received by MEC server 406 at message broker 410. For example, these messages may include the detected instance datasets 512, the 3D position estimates 514, and/or other suitable data that has been described. Message broker 410 may be configured to use any technology to receive and route the large number of messages that may be received from on-premise computing devices 404 distributed throughout a 3D space. For example, message broker 410 may use an MQTT message technology or other suitable technology. In some examples, the 3D space managed by MEC server 406 may be large enough that messages may need to be routed to several position resolution services 412 associated with different parts of the 3D space (e.g., a northwest position resolution service for a northwest portion of a warehouse, a northeast position resolution service for a northeast portion of the warehouse, etc.).

MEC server 406 is also shown to include calibration processes 408, which will be understood to help initially determine and continually maintain accurate intrinsic and/or extrinsic parameters for each image capture device 402. These parameters may be obtained by any suitable calibration processes 408 and, as has been mentioned and will further be made apparent, may be important for allowing system 100 to accurately resolve the 3D positions of the various objects present within the 3D space.

Position resolution services 412 may receive (e.g., by way of routing processes in message broker 410) relevant detected instance datasets 512 and/or associated 3D position estimates 514, and, based on this received data, may be configured to both 1) sort the detected instance datasets into groupings corresponding to the various objects present at the scene (operation 204), and 2) to determine the 3D position resolutions of the objects (operation 206).

Figure 7:
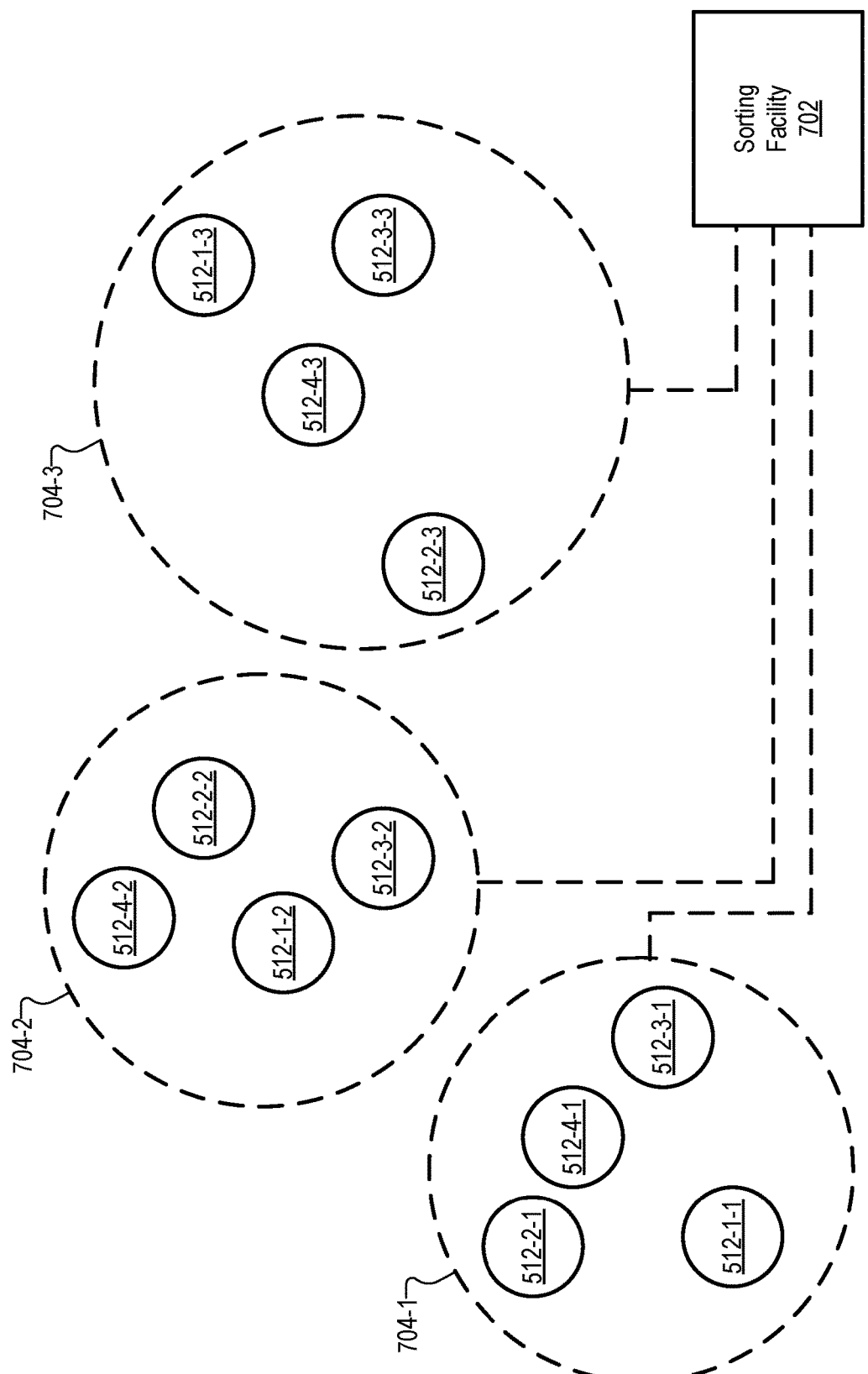
FIG. 7 shows illustrative aspects of how a sorting facility of a multi-view 3D positioning system may sort detected instance datasets in furtherance of resolving 3D positions of multiple objects present within a 3D space.

To further illustrate these functions performed by position resolution services 412, FIG. 7 shows illustrative aspects of how a sorting facility 702 of system 100 (e.g., implemented as part of position resolution service 412) may sort detected instance datasets 512 in furtherance of resolving 3D positions of multiple objects present within a 3D space. In FIG. 7, detected instance datasets 512 are illustrated as small circles labeled in accordance with the same numbering scheme described above with respect to FIG. 6. Each of these detected instance datasets will be understood to be associated with a 3D position estimate that may be determined either according to the monocular depth estimation procedures described above (e.g., when the object is newly identified and its position not yet estimated) or by accessing data from a previous frame logged in a data store (e.g., point-of-interest data store 414, as described in more detail below). The small circles in FIG. 7 are positioned in accordance with the 3D position estimates for the detected instance datasets 512 and sorting facility 702 is shown to be configured to sort these detected instance datasets into different groupings 704 corresponding to different objects (e.g., grouping 704-1 for object 304-1, grouping 704-2 for object 304-2, and grouping 704-3 for object 304-3 in this example). As such, it is shown that each detected instance dataset 512 is grouped together with other detected instance datasets that correspond to a same object (e.g., all the detected instance datasets 512 corresponding to object 304-1 are grouped together into grouping 704-1).

Once the detected instance datasets 512 are correctly associated with one another by being clustered into their respective groupings 704 by sorting facility 702, position calculations performed by position resolution services 412 may resolve an accurate 3D position for each object based on the various detected instance datasets 512 and corresponding 3D position estimates. For example, the determining of a particular 3D position resolution for a particular object 304 (operation 202) may be performed based on each detected instance dataset 512 in a particular grouping 704 corresponding to that particular object 304. This may be performed using any suitable technique (e.g., a triangulation technique, a singular value decomposition technique, etc.) in which a 3D position resolution of an object is determined to be a point of closest approach for rays from two or more viewpoints to where the object is detected from those respective viewpoints.

Figure 8:
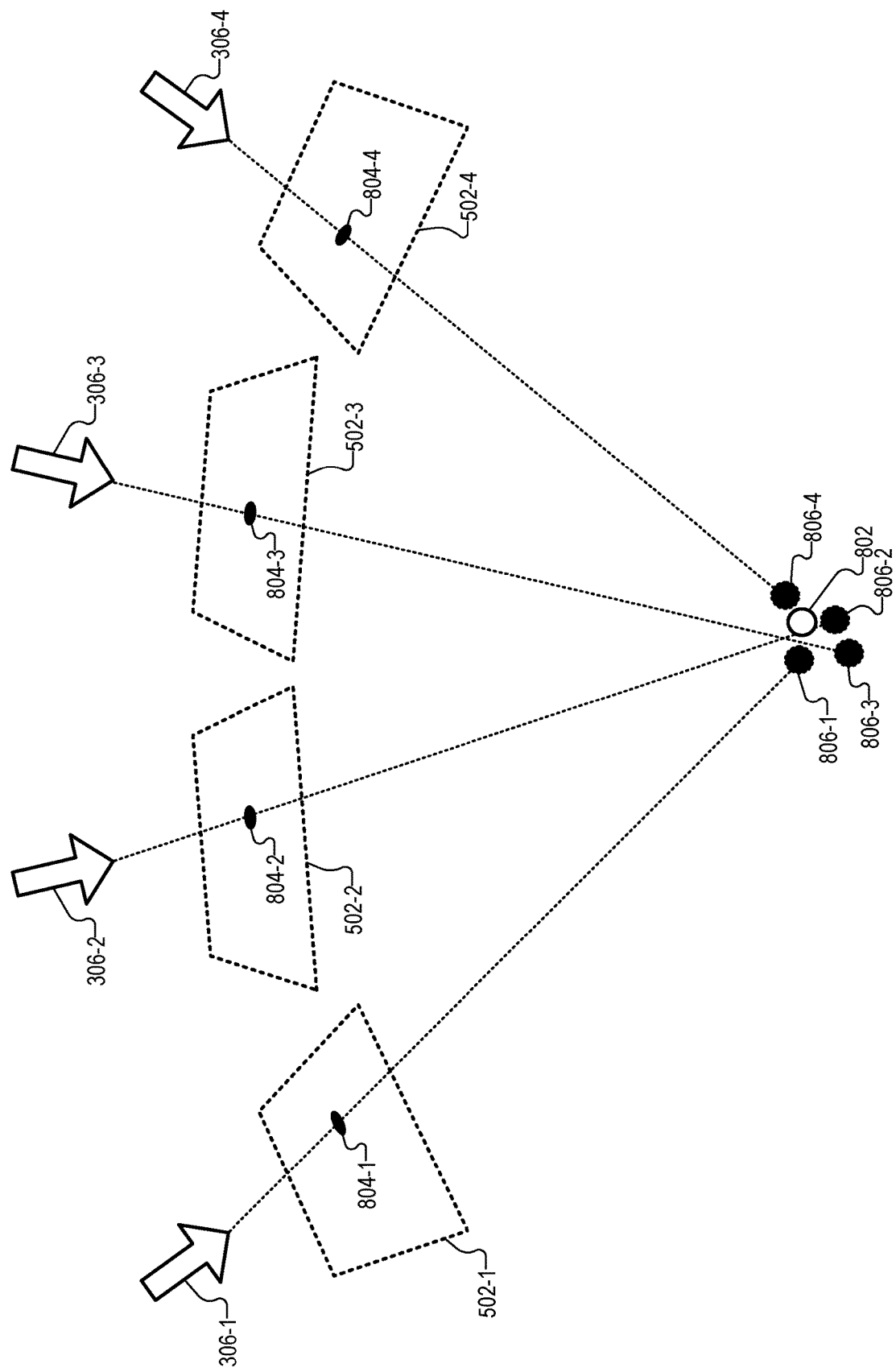
FIG. 8 shows illustrative aspects of how a multi-view 3D positioning system may determine a 3D position resolution for an object based on a grouping of detected instance datasets.

To illustrate, FIG. 8 shows illustrative aspects of how system 100 (e.g., position resolution services 412) may determine a 3D position resolution 802 for an object based on a grouping of detected instance datasets. As shown, various 2D images 502 (e.g., 2D images 502-1 through 502-4 in this example) that are captured from different views 306 (e.g., views 306-1 through 306-4, respectively, in this example) may each include its own depiction 804 of a same object (e.g., a particular one of objects 304, represented by a small black circle in this illustration). As shown, for instance, a depiction 804-1 of the object is included in 2D image 502-1, a depiction 804-2 of the object is included in 2D image 502-2, and so forth for depictions 804-3 and 804-4. Depictions 804 are represented in respective detected instance datasets 512 that have been put into a same grouping 704 for the object in the ways described above. Due to small errors or imperfections in image capture devices, intrinsic and/or extrinsic calibration parameters, information in the detected instance datasets 512, and/or other aspects, FIG. 8 shows that respective 3D position estimates 806 for the object 304 represented by depictions 804 (e.g., 3D position estimate 806-1 for depiction 804-1, 3D position estimate 806-2 for depiction 804-2, etc.) may be near one another, but not perfectly aligned. Accordingly, system 100 may determine 3D position resolution 802 to be disposed at a point that comes closest to all the rays overlapping (e.g., rays from views 306 through depictions 804, represented by dotted lines in FIG. 8). For instance, as mentioned above, this point may be calculated using a singular value decomposition technique, an averaging technique, or any other way of combining 3D position estimates 806 as may serve a particular implementation to generate 3D position resolution 802.

Returning to FIG. 4, objects for which 3D position resolutions have been computed (e.g., by way of position resolution services 412 as described above) may be represented as point-of-interest datasets in a point-of-interest data store 414. For example, once system 100 has completed the operations of method 200 and ultimately determined a 3D position resolution for a particular object present within a 3D space, system 100 may proceed to store, within point-of-interest data store 414, a point-of-interest dataset for that object based on the 3D position resolution that was determined. In this way, system 100 may accumulate and update (track), within point-of-interest data store 414, respective point-of-interest datasets for each object that comes into the 3D space.

Each point-of-interest dataset stored in point-of-interest data store 414 may include certain data to represent the object and its 3D location as the object is tracked through the 3D space over time. For example, a particular point-of-interest dataset for a particular object may include a 3D position resolution (e.g., such as 3D position resolution 802) determined for the particular object, a set of detected instance datasets 512 that have been determined to correspond to the particular object, and/or any other suitable data as may serve a particular implementation. For example, a filtering technique (e.g., using a particle filter, a Kalman filter, etc.) may be used to track the object through the 3D space and positional information may be further smoothed and/or refined so that information such as velocity and acceleration may also be computed and stored.

Figure 9:
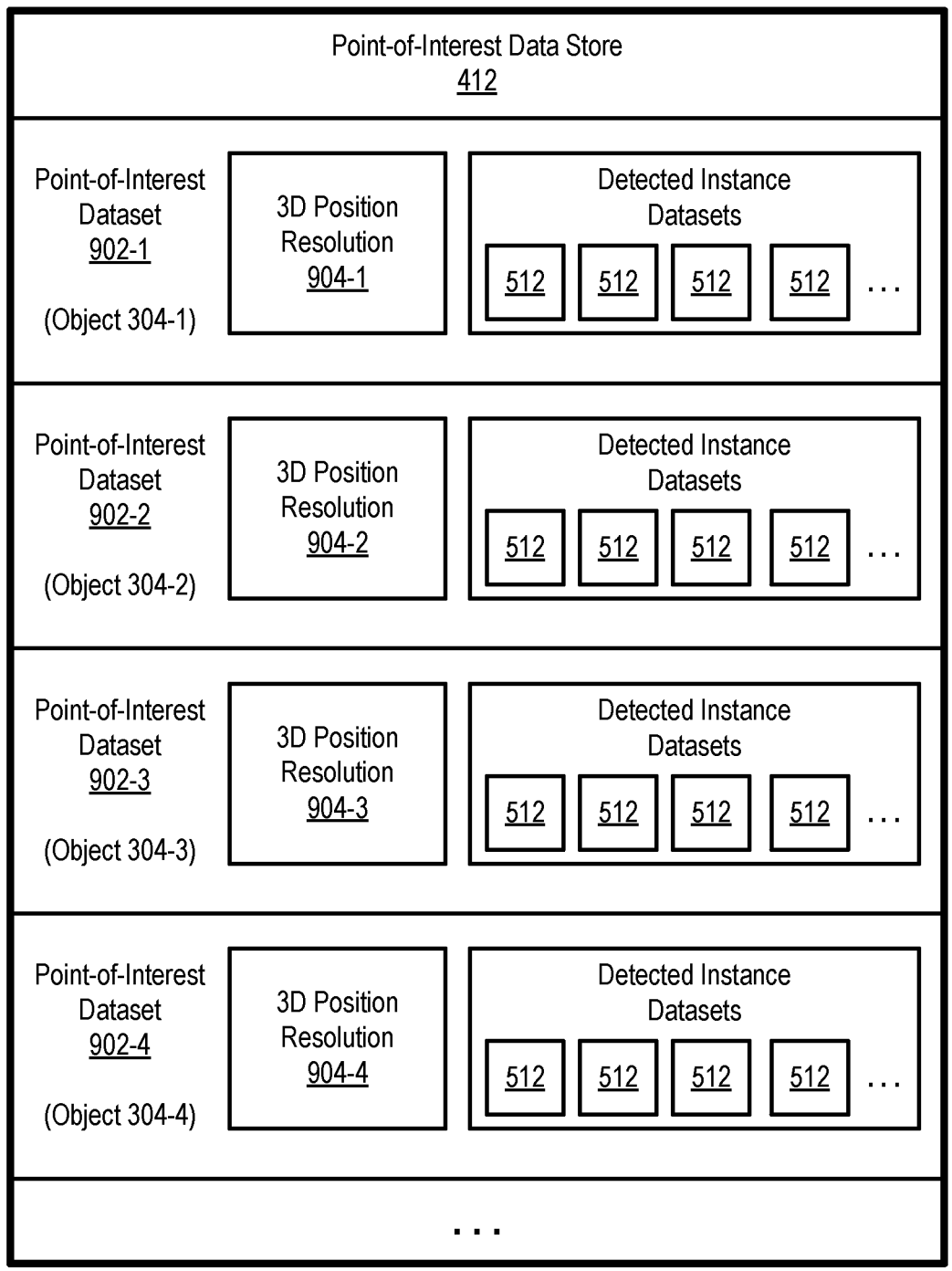
FIG. 9 shows an illustrative point-of-interest data store used by a multi-view 3D positioning system for resolving 3D positions of multiple objects present within a 3D space.

To illustrate, FIG. 9 shows an example implementation of point-of-interest data store 414 that may be used by system 100. As shown, point-of-interest data store 414 includes a plurality of point-of-interest datasets 902 (e.g., point-of-interest datasets 902-1 through 902-4, plus, potentially, various other datasets represented by an ellipsis but not explicitly shown in FIG. 9). Each point-of-interest dataset 902 is associated with a different one of objects 304. For instance, as parenthetically indicated in FIG. 9, point-of-interest dataset 902-1 corresponds to object 304-1, point-of-interest dataset 902-2 corresponds to object 304-2, and so forth. In each point-of-interest dataset 902, a respective 3D position resolution 904 (e.g., 3D position resolution 904-1 for point-of-interest dataset 902-1, 3D position resolution 904-2 for point-of-interest dataset 902-2, etc.) and a respective set of detected instance datasets 512 are also stored. Accordingly, for instance, system 100 may represent object 304-1 within point-of-interest dataset 902-1, and may continuously update the detected instance datasets 512 that are detected for that object (e.g., permanently or on a rolling basis), as well as the resolved 3D position of object 304-1 (3D position resolution 904-1) as object 304-1 moves in time.

Whenever a new video frame is captured and analyzed to identify the objects depicted therein, new detected instance datasets may be registered to existing point-of-interest datasets 902 or new point-of-interest datasets 902 may be generated and added to point-of-interest data store 414 as needed. Accordingly, for a given set of detected instance datasets 512 that correspond to a particular object 304 and are included in a particular point-of-interest dataset 902, the set may comprise: 1) one or more detected instance datasets from among the plurality of detected instance datasets to which the respective 3D positions estimates have been assigned; 2) one or more detected instance datasets that are not from among the plurality of detected instance datasets to which the respective 3D positions estimates have been assigned; and/or a combination of both types of detected instance datasets. In other words, the set of detected instance datasets 512 for a given point-of-interest dataset may include detected instance datasets 512 for "new" or "unknown" objects and to which respective 3D position estimates 514 were assigned (as described above in relation to FIG. 6), detected instance datasets 512 for "previously registered" or "known" objects and to which respective 3D position estimates 514 have not been assigned, and/or a combination of both.

Returning to FIG. 4, system 100 may provide output representing the various objects (points of interest) represented in point-of-interest data store 414 to user device 418 for use in furtherance of any of the applications or use cases described herein or as may serve a particular implementation. For instance, in the warehouse example that has been used throughout the description above, application 420 may allow a user to search for any particular inventory item, personnel, or equipment and immediately discover where that object is located within the warehouse. As another example, a mapping showing some or all of the tracked items may be presented to allow the user to see, in real time, how people, equipment, and inventory are moving through the warehouse.

Figure 10:
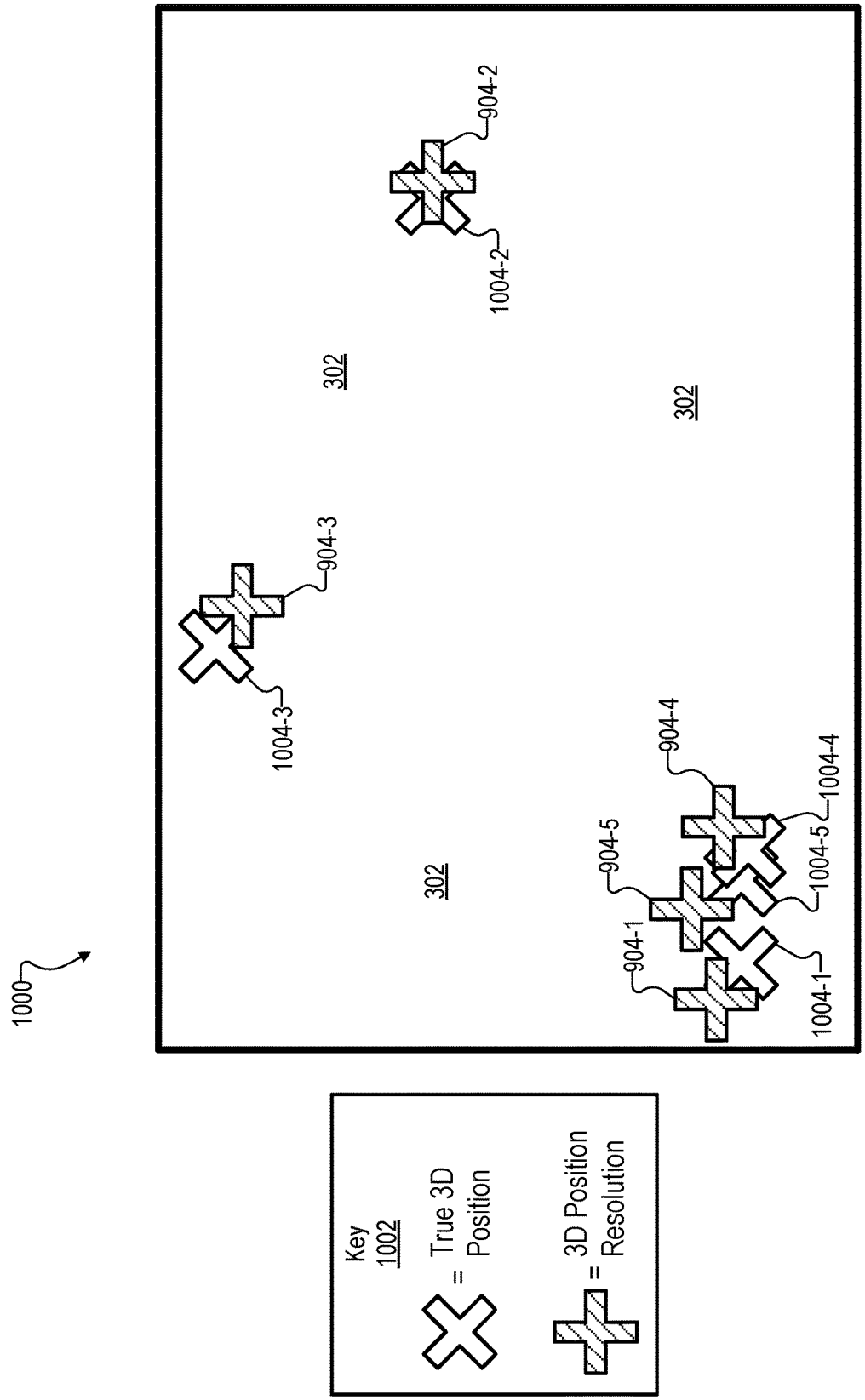
FIG. 10 shows an illustrative mapping of the 3D position resolutions of multiple objects within a 3D space.

FIG. 10 shows an example of such a mapping of the 3D position resolutions of multiple objects within a 3D space. Specifically, as shown, a mapping 1000 uses shaded '+' symbols to indicate where the 3D position resolutions 904 for each of the objects is located within 3D space 302 (from an overhead view of the 3D space in this example). As indicated by a key 1002, white 'x' symbols are also indicated in FIG. 10 to illustrate respective true 3D positions 1004 (e.g., true position 1004-1 of object 304-1, true position 1004-2 of object 304-2, etc.) of the respective objects in 3D space 302. It will be understood that this ground truth information illustrated by true locations 1004 may not actually be known to system 100 or provided to user device 418 (since the 3D position resolutions 904 represent the most accurate estimations of the positions known to system 100). However, as can be seen in FIG. 10, the calculated 3D position resolutions 904 may be perfectly or very closely aligned with ground truth (i.e., true positions 1004), thereby providing very helpful and reliable information to application 420.

Returning to FIG. 4, also shown within user device 418 along with application 420 is an analytics service 422. Along with presenting mappings such as mapping 1000 and performing other application functions described above, user device 418 may also use the output data provided by system 100 to perform analytics to help, for example, make warehouse operations more efficient. For example, analytics service 422 may determine that inventory in certain parts of the warehouse is moved less efficiently, which may lead to a discovery that there is a crack in the floor that forklifts are needing to steer around and that analytics service 422 may recommend repairing to increase productivity. As another example, analytics service 422 may determine that one particular worker is especially effective and hardworking, and may recommend that the worker should be recognized and awarded accordingly. Various other such analytics may be performed by analytics service 422 for the warehouse application and/or for other applications and use cases as may serve a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
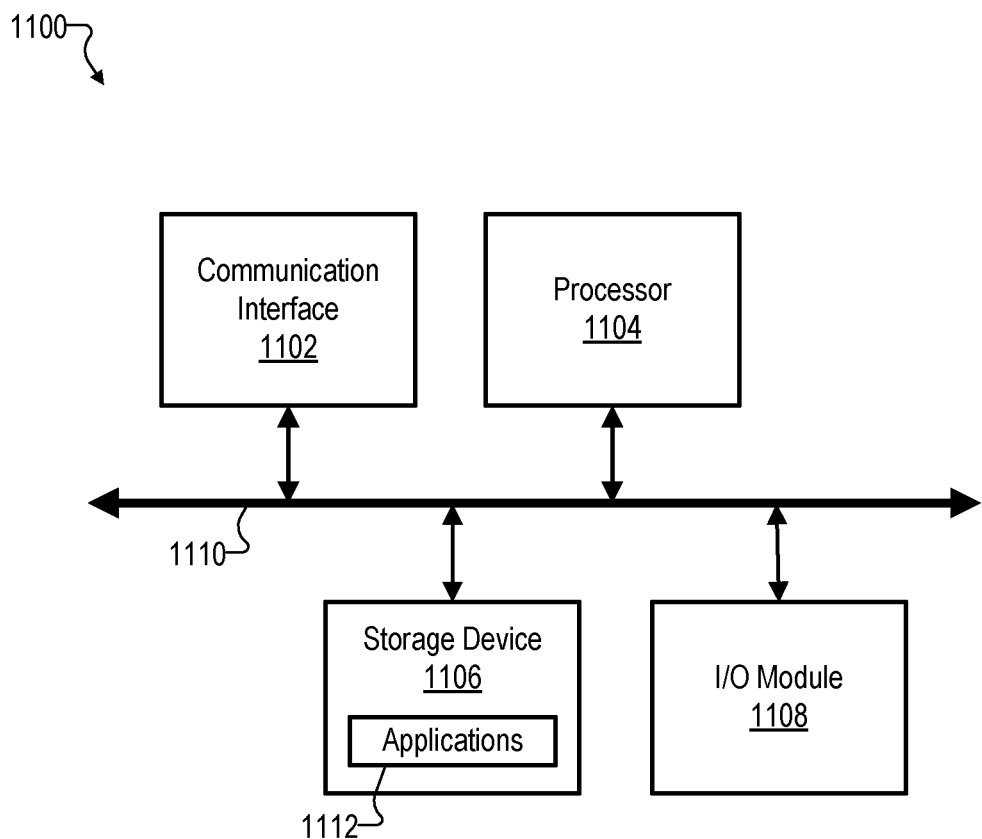
FIG. 11 shows an illustrative computing device that may implement multi-view 3D positioning systems and/or other computing systems described herein.

FIG. 11 shows an illustrative computing device 1100 that may implement multi-view 3D positioning systems and/or other computing systems described herein. For example, computing device 1100 may include or implement (or partially implement) a multi-view 3D positioning system such as system 100, an image capture device such as image capture devices 402, an on-premise computing device such as on-premise computing devices 404, a multi-access server such as MEC server 406 or a cloud server, a user device such as user device 418, certain elements of a network such as network 416, and/or any other computing devices or systems described herein (or any elements or subsystems thereof).

As shown in FIG. 11, computing device 1100 may include a communication interface 1102, a processor 1104, a storage device 1106, and an input/output (I/O) module 1108 communicatively connected via a communication infrastructure 1110. While an illustrative computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
assigning a respective 3D position estimate, with respect to a 3D space, to each of a plurality of detected instance datasets corresponding to a plurality of objects present within the 3D space;
sorting, based on the 3D position estimates, the plurality of detected instance datasets into a plurality of groupings corresponding to the plurality of objects so that each detected instance dataset is grouped together with other detected instance datasets corresponding to a same object;
determining a respective 3D position resolution, with respect to the 3D space, for each of the plurality of objects, the 3D position resolutions determined based on the plurality of groupings of detected instance datasets and representing, with greater accuracy than the 3D position estimates, 3D positions of the plurality of objects within the 3D space; and
storing, within a data store and based on the respective 3D position resolutions determined for each of the plurality of objects, respective point-of-interest datasets for each of the plurality of objects, wherein a particular point-of-interest dataset for a particular object includes:
a 3D position resolution determined for the particular object; and
a set of detected instance datasets that correspond to the particular object.

2. The method of claim 1, wherein:
the plurality of detected instance datasets includes:
a first detected instance dataset corresponding to a particular object of the plurality of objects, the first detected instance dataset generated based on a first 2D image depicting the particular object and captured by a first image capture device in the 3D space, and
a second detected instance dataset corresponding to the particular object, the second detected instance dataset generated based on a second 2D image depicting the particular object and captured by a second image capture device in the 3D space;

the method further comprises:
identifying, using an object recognition algorithm, the particular object within the first 2D image and within the second 2D image, assigning, based on the identifying and using a tracking algorithm configured to track object depictions that move from frame to frame in a 2D frame sequence, respective 2D identifiers to the particular object for each of the respective first and second 2D images, and associating, within both the first and second detected instance datasets, the particular object with the respective 2D identifiers assigned to the particular object; and the sorting of the plurality of detected instance datasets into the plurality of groupings includes sorting, based on the respective 2D identifiers associated with the particular object within the first and second detected instance datasets, the first and second detected instance datasets into a same grouping that corresponds to the particular object.

3. The method of claim 2, wherein:
the object recognition algorithm is implemented by a You-Only-Look-Once (YOLO) algorithm; and
the tracking algorithm is implemented by a Deepsort tracking algorithm.

4. The method of claim 1, wherein the assigning of the respective 3D position estimates is based on:
extrinsic parameters of a set of image capture devices that capture 2D imagery on which the plurality of detected instance datasets is based; and
an estimated depth map for objects depicted in the 2D imagery, the estimated depth map generated by a monocular depth estimation algorithm configured to estimate depth based on monoscopic imagery.

5. The method of claim 1, wherein each detected instance dataset included in the particular point-of-interest dataset includes:
a respective 2D identifier associated with the particular object;
a respective 2D position of a depiction of the particular object with respect to a 2D image on which the particular detected instance dataset is based; and
an indication of a size of the depiction of the particular object with respect to the 2D image.

6. The method of claim 1, wherein the set of detected instance datasets that correspond to the particular object and are included in the particular point-of-interest dataset comprises a detected instance dataset from among the plurality of detected instance datasets to which the respective 3D positions estimates have been assigned.

7. The method of claim 1, wherein the set of detected instance datasets that correspond to the particular object and are included in the particular point-of-interest dataset comprises a detected instance dataset that is not from among the plurality of detected instance datasets to which the respective 3D positions estimates have been assigned.

8. The method of claim 1, wherein the plurality of detected instance datasets includes:
a first detected instance dataset generated based on a first 2D image that is captured by a first image capture device in the 3D space, and a second detected instance dataset generated based on a second 2D image that is captured, asynchronously with the first 2D image, by a second image capture device in the 3D space.

9. The method of claim 1, wherein the determining of a particular 3D position resolution for a particular object is performed based on each detected instance dataset in a particular grouping corresponding to the particular object and including at least two detected instance datasets corresponding to the particular object.

10. The method of claim 1, wherein:
the 3D space includes a warehouse space in which warehouse personnel use equipment to manage inventory stored in the warehouse space; and
the plurality of objects includes at least one object associated with the warehouse personnel, at least one object associated with the equipment, and at least one object associated with the inventory stored in the warehouse space.

11. A system comprising:
a memory storing instructions; and
one or more processors communicatively coupled to the memory and configured to execute the instructions to perform a process comprising:
assigning a respective 3D position estimate, with respect to a 3D space, to each of a plurality of detected instance datasets corresponding to a plurality of objects present within the 3D space;
sorting, based on the 3D position estimates, the plurality of detected instance datasets into a plurality of groupings corresponding to the plurality of objects so that each detected instance dataset is grouped together with other detected instance datasets corresponding to a same object;
determining a respective 3D position resolution, with respect to the 3D space, for each of the plurality of objects, the 3D position resolutions determined based on the plurality of groupings of detected instance datasets and representing, with greater accuracy than the 3D position estimates, 3D positions of the plurality of objects within the 3D space; and
storing, within a data store and based on the respective 3D position resolutions determined for each of the plurality of objects, respective point-of-interest datasets for each of the plurality of objects, wherein a particular point-of-interest dataset for a particular object includes:
a 3D position resolution determined for the particular object; and
a set of detected instance datasets that correspond to the particular object.

12. The system of claim 11, further comprising a plurality of image capture devices disposed within the 3D space and configured to capture 2D imagery on which the plurality of detected instance datasets are based;
wherein the memory and the one or more processors are implemented within:
a plurality of on-premise computing devices operating at a site of the 3D space and communicatively coupled with the plurality of image capture devices, the plurality of on-premise computing devices configured to generate the detected instance datasets based on the 2D imagery and to perform the assigning of the respective 3D positions estimates; and
a multi-access edge compute (MEC) server communicatively coupled to the plurality of on-premise computing devices and configured to perform the sorting and the determining of the respective 3D position resolutions based on the plurality of detected instance datasets and the respective 3D position estimates.

13. The system of claim 11, wherein:
the plurality of detected instance datasets includes:
   a first detected instance dataset corresponding to a particular object of the plurality of objects, the first detected instance dataset generated based on a first 2D image depicting the particular object and captured by a first image capture device in the 3D space, and
   a second detected instance dataset corresponding to the particular object, the second detected instance dataset generated based on a second 2D image depicting the particular object and captured by a second image capture device in the 3D space;
the process further comprises:
   identifying, using an object recognition algorithm, the particular object within the first 2D image and within the second 2D image,
   assigning, based on the identifying and using a tracking algorithm configured to track object depictions that move from frame to frame in a 2D frame sequence, respective 2D identifiers to the particular object for each of the respective first and second 2D images, and
   associating, within both the first and second detected instance datasets, the particular object with the respective 2D identifiers assigned to the particular object; and
the sorting of the plurality of detected instance datasets into the plurality of groupings includes sorting, based on the respective 2D identifiers associated with the particular object within the first and second detected instance datasets, the first and second detected instance datasets into a same grouping that corresponds to the particular object.

14. The system of claim 11, wherein the assigning of the respective 3D position estimates is based on:
   extrinsic parameters of a set of image capture devices that capture 2D imagery on which the plurality of detected instance datasets is based; and
   an estimated depth map for objects depicted in the 2D imagery, the estimated depth map generated by a monocular depth estimation algorithm configured to estimate depth based on monoscopic imagery.

15. A non-transitory computer-readable medium storing instructions that, when executed, direct a processor of a computing device to perform a process comprising:
   assigning a respective 3D position estimate, with respect to a 3D space, to each of a plurality of detected instance datasets corresponding to a plurality of objects present within the 3D space;
   sorting, based on the 3D position estimates, the plurality of detected instance datasets into a plurality of groupings corresponding to the plurality of objects so that each detected instance dataset is grouped together with other detected instance datasets corresponding to a same object;
   determining a respective 3D position resolution, with respect to the 3D space, for each of the plurality of objects, the 3D position resolutions determined based on the plurality of groupings of detected instance datasets and representing, with greater accuracy than the 3D position estimates, 3D positions of the plurality of objects within the 3D space; and
   storing, within a data store and based on the respective 3D position resolutions determined for each of the plurality of objects, respective point-of-interest datasets for each of the plurality of objects, wherein a particular point-of-interest dataset for a particular object includes:
      a 3D position resolution determined for the particular object; and
      a set of detected instance datasets that correspond to the particular object.

16. The non-transitory computer-readable medium of claim 15, wherein:
the plurality of detected instance datasets includes:
   a first detected instance dataset corresponding to a particular object of the plurality of objects, the first detected instance dataset generated based on a first 2D image depicting the particular object and captured by a first image capture device in the 3D space, and
   a second detected instance dataset corresponding to the particular object, the second detected instance dataset generated based on a second 2D image depicting the particular object and captured by a second image capture device in the 3D space;
the process further comprises:
   identifying, using an object recognition algorithm, the particular object within the first 2D image and within the second 2D image,
   assigning, based on the identifying and using a tracking algorithm configured to track object depictions that move from frame to frame in a 2D frame sequence, respective 2D identifiers to the particular object for each of the respective first and second 2D images, and
   associating, within both the first and second detected instance datasets, the particular object with the respective 2D identifiers assigned to the particular object; and
the sorting of the plurality of detected instance datasets into the plurality of groupings includes sorting, based on the respective 2D identifiers associated with the particular object within the first and second detected instance datasets, the first and second detected instance datasets into a same grouping that corresponds to the particular object.

17. The non-transitory computer-readable medium of claim 15, wherein the assigning of the respective 3D position estimates is based on:
   extrinsic parameters of a set of image capture devices that capture 2D imagery on which the plurality of detected instance datasets is based; and
   an estimated depth map for objects depicted in the 2D imagery, the estimated depth map generated by a monocular depth estimation algorithm configured to estimate depth based on monoscopic imagery.

* * * * *